United States Patent Office 3,177,848
Patented Apr. 13, 1965

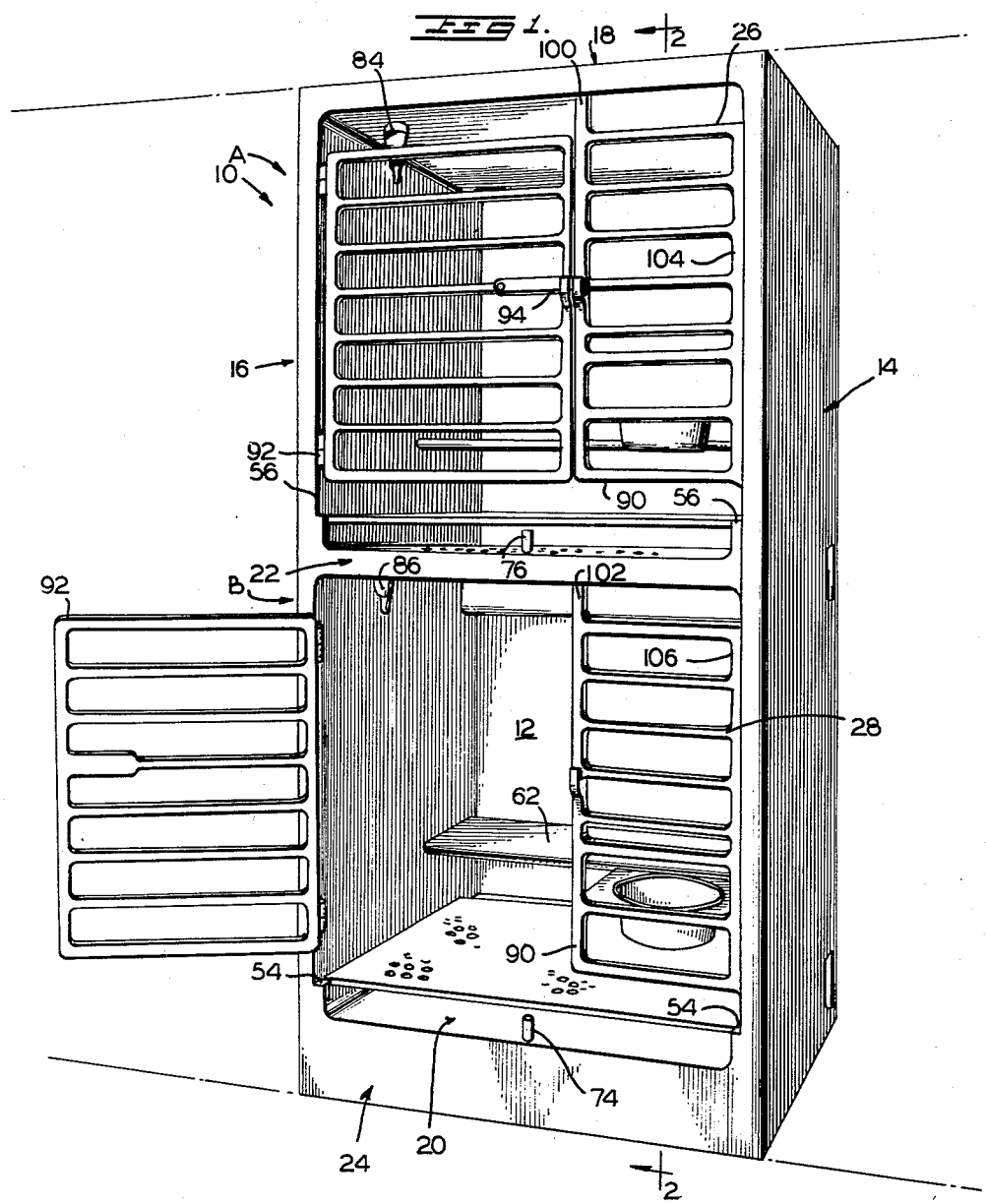

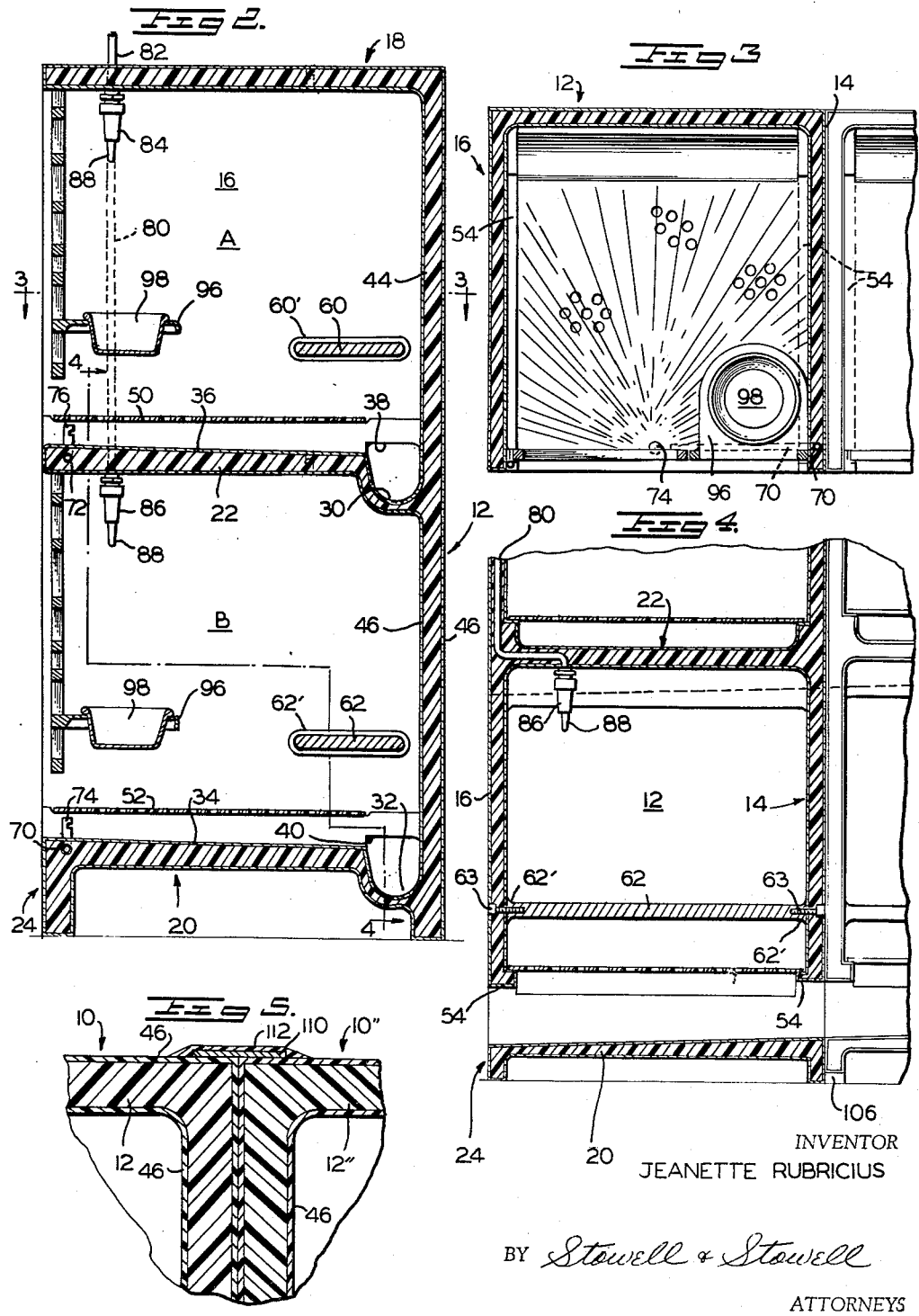

3,177,848
SMALL ANIMAL CAGE WITH CONNECTIBLE
DRAINAGE TROUGHS
Jeanette L. Rubricius, 85—35 Midland Parkway,
Jamaica, N.Y.
Filed Mar. 6, 1962, Ser. No. 177,896
6 Claims. (Cl. 119—17)

This invention relates to cages and in particular to improvements in small animal cages or housing units.

It is a particular object of the present invention to provide a small animal housing unit consisting of a pair of superimposed cages having integrally formed side, top, bottom and back walls.

It is a further object of the present invention to provide such a small animal housing unit having improved drain means with floors sloping to said drain means whereby the housing unit may be conveniently maintained sanitary and odor free.

A further object is to provide such a housing unit which may be assembled in side-by-side relationship to further units whereby all of the side-by-side units are provided with a common drainage system, and wherein further units may be positioned in back-to-back relationship therewith.

A further object is to provide a housing unit which when assembled with further housing units may be conveniently sealed together thereby eliminating cracks and spaces for the collection of foreign matter and the resulting generation of unpleasant odors.

Another object is to provide an improved small animal housing unit having novel floor cleaning spray units, and individual animal operated liquid dispensing means.

Another object is to provide a small animal housing unit that is light in weight, sturdy in construction, relatively inexpensive to construct, and is readily maintained in a sanitary odor-free condition.

These and other objects and advantages of the present invention are provided in a small animal housing unit comprising integral top, side and back walls, a lower floor member integrally joined to said back and side walls and spaced from the lower extremities thereof, a generally transverse partition member integrally joined to the side and back walls and spaced intermediate the top and lower floor member, a trough integrally formed in the floor member and in the partition member, said troughs extending across the back wall of the housing unit and sloping from one side wall to the other, an opening through the side walls at least at the lower end of each of the troughs, the upper surface of the floor member and said partition member sloping downwardly from the front edge thereof to the respective trough, and separate grille means extending between the top and side walls and the partition member and between the partition and floor member and the side walls, each of said grille means including an openable section permitting access into the housing unit.

The invention will be more particularly described with reference to the accompanying drawings wherein:

FIG. 1 is a perspective view of a small animal housing unit constructed in accordance with the teachings of the present invention;

FIG. 2 is a vertical sectional view on line 2—2 of the small animal housing unit shown in FIG. 1;

FIG. 3 is a section substantially along line 3—3 of one of the cages of the housing unit shown in FIG. 2 with the false floor removed and a portion of an adjacent housing unit;

FIG. 4 is a section substantially on line 4—4 of FIG. 2, and

FIG. 5 is an enlarged fragmentary sectional view through the side and back walls of a pair of housing units showing one method of joining a pair of units to form a substantially permanent installation.

Referring to the drawings, 10 generally designates an embodiment of the small animal housing unit of the invention including an upper section A and a lower section B. The housing unit generally comprises a back wall 12, side walls 14 and 16, top wall 18, lower floor member 20, partition member 22, front skirt member 24, and separate grille means 26 and 28.

The rearward end of the floor member 20 and the partition member 22 are shaped to provide a pair of troughs 30 and 32 which troughs extend across the back of the housing unit adjacent the back wall 12 thereof. The troughs 30 and 32 are sloped downwardly from, for example, side wall 14 to side wall 16 in the illustrated form of the invention. It will be appreciated that each of the troughs 30 and 32 may be sloped downwardly from side wall 16 to side wall 14, depending upon which side wall of the housing unit is to be connected to further drain means.

As more clearly shown in FIGS. 2 and 4, the upper surface 34 of the floor member 20 and the upper surface 36 of the partition member 22 slope from the front edges thereof downwardly and rearwardly into the respective troughs 30 and 32.

Further, as illustrated in the drawings, one or both of the side walls 14 and 16 may be provided with openings generally designated 38 and 40 which communicate with the troughs whereby at the lower end of the trough, at the wall 16, the material collected therein may be suitably disposed of and at the upper end, at the wall 14, troughs 30 and 32 from adjacently positioned cages may empty into the troughs of the lower housing unit as to be more fully described hereinafter. Where only a single housing unit is employed or where the housing units are to be positioned in spaced apart relationship, the openings 38 and 40 in the side wall at the upper end of the troughs 30 and 32 are suitably sealed or the housing units are constructed without said openings whereby only the lower ends of the troughs 30 and 32 have communication with the outer surface of the side walls of the housing units.

In constructing the small animal housing unit, the top, side and back walls, the transverse partition member, the floor member and the front skirt are cast or molded as a single unit, thereby eliminating cracks and crevices where these elements would normally be joined one to another. The outer surface of the housing unit is molded from a lightweight strong plastic material such as an epoxy resin, a polyester reinforced with fiberglass or polypropylene. This constitutes a tough outer skin 46 for the cages. The skin is then embedded in a lightweight plastic foam such as polystyrene or polyurethane foam. It is also possible to mold the polystyrene foam and place the skin on as a surface coating on the foam.

The combination of the foam plastic interior with a plastic skin on the interior and exterior surfaces thereof provides a rigid, lightweight unit which may be conveniently manufactured and insures extended periods of carefree use. Although the cage is preferably constructed of plastic, the design lends itself to fabrication with metal such as stainless steel.

Preferably, each of the cages A and B is provided with a false bottom 50 and 52, respectively. The false bottoms 50 and 52 may be constructed of perforated or expanded metal or, preferably, a perforated sheet of reinforced fiberglass or the like. Each of the false bottoms 50 and 52 extends from offset ledges 54 formed between the side walls 14 and 16 and the skirt member 24 in section B and partition member 22 and the side walls 16 and 14 in section B. As more clearly shown in FIGS. 3 and 4, the offset ledge portions extend rearwardly to the troughs 30 and 32 to provide edge support for the false floors 50 and 52. Further, as more clearly illustrated in FIGS. 2 and 3, the false floors 50 and 52 terminate just short of the forward edge of each of the troughs 30 and 32 whereby foreign matter may be flushed from the false floors into the respective troughs.

Where desired, a platform 60 and 62 may be provided in each of the cages A and B with the platforms extending generally between the side walls 14 and 16 adjacent the rear wall 12 and above the false floors 50 and 52, respectively. The platforms 60 and 62 are preferably constructed of metal. The platforms 60 and 62 are cast of solid metal to avoid sharp edges and crevices and the side edges 60′ and 62′ of the platforms are coved into the side walls of the cage. The platforms are secured in place by countersunk bolts or screws 63.

The rods 68 supporting the platforms 60 and 62 are spaced such that when the platforms are positioned thereon, the most rearward edge 66 of each of the platforms is spaced from the inner surface of the back wall to facilitate the cleaning of the cages and to reduce to a minimum areas where foreign matter may collect.

In the preferred form of the invention, the floor member 20 and the partition member 22 are cast with pipe or conduit means 70 and 72 therein just rearwardly of the leading edges of these members. Each of the pipe means 70 and 72 communicates with a novel irrigating nozzle means generally designated 74 and 76. Irrigation nozzles 74 and 76 have arcuate, slot-like water outlets whereby when the pipes 70 and 72 are connected to a source of water under pressure, a spray of flushing liquid is directed substantially entirely across the upper sloping surfaces 34 and 36 of the floor member 20 and the partition member 22 as illustrated in FIG. 3 of the drawings. This flushing liquid cleanses these surfaces and drains into the troughs 30 and 32. By using arcuate, slot-like outlets for the irrigating nozzles 74 and 76, the sloping floors 34 and 36 may be flushed without disturbing animals on the false floors 50 and 52 or on the platforms 60 or 62 in cages A or B.

As more clearly illustrated in FIGS. 2 and 4, a further water conducting pipe system generally designated 80 is cast in the foam walls of the housing unit. The water conducting pipe unit 80 is connected to a source of drinking water under pressure via conduit 82 shown in FIG. 2 of the drawings.

The water conducting unit 80 is connected to a pair of animal actuatable drinking units 84 and 86 in cages A and B, respectively. The animal actuated drinking units are of conventional design and may be constructed as shown in U.S. Patent 2,939,424 whereby when an animal licks the downwardly projecting elements 88, water drips from the end thereof into the animal's mouth. The drinking units 84 and 86 are positioned near the front of the cages so that they may be readily removed and sterilized.

Each of the grilles 26 and 28 includes a fixed portion 90 and a pivotally mounted door portion 92 with cooperating latch means 94 for latching the pivotally mounted door portions 92 to the fixed grille portions 90. In the illustrated form of the invention, the fixed grille portions and the pivotally mounted door portions 92 are of cast construction and each of the bars are smoothly faired into the longitudinally extending members of the grille. The fixed and door portions of the grille units may be cast of, for example, aluminum or plastic. Where a metal such as iron is employed in constructing the grille units the cast units are then preferably plastic coated to prevent rusting.

As shown in the drawings, the fixed grille units 90 may include a small platform 96 provided with an opening therein adapted to receive a feeding bowl or dish 98. Supporting the food bowl or dish 98 in the opening in the platform 96 reduces food spillage and permits feeding of the animal without opening the cage door 92. The fixed grille portions 90 are attached to the housing unit by pin connecting the vertical member 100 to the roof 18 and the vertical member 102 to the transverse partition member 22 while the complementary vertical members 104 and 106 are screwed to the inner surface of the side wall 14.

As hereinbefore discussed, a plurality of the small animal housing units may be arranged in side-by-side relationship with the drainage channels 30 and 32 of each of the units positioned in waste transferring relationship. Where a plurality of the units are to be so assembled, the troughs of one housing unit are aligned with the troughs of its neighbor when the neighboring housing unit is raised one inch to account for the one-inch slope in the troughs. A one-inch quadrangular sleeper generally designated 106 in FIG. 4 of the drawings has been found to very satisfactorily align the housing units.

Further, where a plurality of the housing units are assembled in side-by-side relationship, the cracks between adjacent cages are preferably sealed with either, for example, a Mylar pressure sensitive adhesive tape where a non-permanent installation is desired, or the cracks may be sealed with a fiberglass strip covered with an epoxy cement or a liquid polyester adhesive. Referring to FIG. 5, a permanent assembly is illustrated wherein back walls 12 and 12′ of housing units 10 and 10′ are joined one to another by a plastic tape or strip 110 coated with an epoxy adhesive 112. It will also be appreciated that the cracks between the floor of the building and the housing unit should be sealed and may be conveniently sealed by painting the floor and the cage with a liquid epoxy or polyester adhesive. Tape is generally not necessary at these joints unless the floors are particularly uneven. Further, the points of juncture between troughs of adjacent housing units are sealed with tape and a suitable adhesive for permanent installations or a Mylar tape with a pressure sensitive adhesive may be employed on temporary installations.

From the foregoing description, it will be seen that the present invention fully accomplishes the aims and objects hereinbefore set forth. It will be appreciated that various modifications may be made in the form of the structures shown in the drawings and described herein without departing from the scope of the present invention. For example, in the illustrated form of the invention, each of the housing units comprises a pair of cages A and B; however, where particularly small animals such as rabbits and cats or the like are to be housed, it will be appreciated that each unit may be conveniently made three cages high without departing from the teachings of the present invention.

I claim:

1. A small animal housing unit comprising integral top, side and back walls, a lower floor member integrally formed with said back and side walls and spaced from the lower extremities thereof, a generally transverse partition member integrally formed with the side and back walls and spaced intermediate the top and lower floor member, a trough integrally formed in the floor member and in the partition member, said troughs extending across the back wall of the housing and sloping from one side wall to the other, an opening through the side walls at least at the lower end of each of the troughs, the upper surface of the floor member and the partition members sloping downwardly from the front edge thereof to the respective troughs, and separate grille means extending between the top and side walls and the partition member and between the partition and floor members and the side walls, each of said grille means including an openable section permitting access into the housing unit.

2. A small animal housing unit comprising integral top, side and back walls, a lower floor member integrally formed with said back and side walls and spaced from the lower extremities thereof, a generally transverse partition member integrally formed with the side and back walls and spaced intermediate the top and lower floor member, said integral top, side and back walls and said floor and partition members being integrally cast from an expanded foam plastic composition with the interior and exterior surfaces thereof coated with an impervious sheet material, a trough integrally formed in the floor member and in the partition member, said troughs extending across the back wall of the housing and sloping from one side wall to the other, an opening through the side walls at least at the lower end of each of the troughs, the upper surface of the floor member and the partition members sloping downwardly from the front edge thereof to the respective troughs, and separate grille means extending between the top and side walls and the partition member and between the partition and floor members and the side walls, each of said grille means including an openable section permitting access into the housing unit.

3. A small animal housing unit comprising integral top, side and back walls, a lower floor member integrally formed with said back and side walls and spaced from the lower extremities thereof, a generally transverse partition member integrally formed with the side and back walls and spaced intermediate the top and lower floor member, a trough integrally formed in the floor member and in the partition member, said troughs extending across the back wall of the housing and sloping from one side wall to the other, a perforated false floor positioned above the floor member and partition member, said false floors terminating at the rearward ends of the partition member and the floor member adjacent the forward edges of the troughs formed therein, an opening through the side walls at least at the lower end of each of the troughs, the upper surface of the floor member and the partition members sloping downwardly from the front edge thereof to the respective troughs, and separate grille means extending between the top and side walls and the partition member and between the partition and floor members and the side walls, each of said grille means including an openable section permitting access into the housing unit.

4. A small animal housing unit comprising integral top, side and back walls, a lower floor member integrally formed with said back and side walls and spaced from the lower extremities thereof, a generally transverse partition member integrally formed with the side and back walls and spaced intermediate the top and lower floor member, a trough integrally formed in the floor member and in the partition member, said troughs extending across the back wall of the housing and sloping from one side wall to the other, a perforated false floor positioned above the floor member and partition member, said false floors terminating at the rearward ends of the partition member and the floor member adjacent the forward edges of the troughs formed therein, an irrigation nozzle projecting upwardly from the forward edge of said floor member and said partition member and having an arcuate outlet for directing a flow of flushing liquid across the sloping surface of the floor member and the partition member, an opening through the side walls at least at the lower end of each of the troughs, the upper surface of the floor member and the partition members sloping downwardly from the front edge thereof to the respective troughs, and separate grille means extending between the top and side walls and the partition member and between the partition and floor members and the side walls, each of said grille means including an openable section permitting access into the housing unit.

5. A small animal housing unit comprising integral top, side and back walls, a lower floor member integrally formed with said back and side walls and spaced from the lower extremities thereof, a generally transverse partition member integrally formed with the side and back walls and spaced intermediate the top and lower floor member, a trough integrally formed in the floor member and in the partition member, said troughs extending across the back wall of the housing and sloping from one side wall to the other, a perforated false floor positioned above the floor member and partition member, said false floors terminating at the rearward ends of the partition member and the floor member adjacent the forward edges of the troughs formed therein, an irrigation nozzle projecting upwardly from the forward edge of said floor member and said partition member and having an arcuate outlet for directing a flow of flushing liquid across the sloping surface of the floor member and the partition member, an opening through the side walls at least at the lower end of each of the troughs, the upper surface of the floor member and the partition members sloping downwardly from the front edge thereof to the respective troughs, a platform extending between the side walls of the housing unit and above each of the perforated false floors, the most rearward edge of each of the platforms terminating in spaced relation to the inner surface of the back wall of the housing unit, and separate grille means extending between the top and side walls and the partition member and between the partition and floor members and the side walls, each of said grille means including an openable section permitting access into the housing unit.

6. An animal housing unit consisting of five solid sides including a floor and an open front, a grille extending in said open front, at least a portion of said grille being hinged to provide a door to the cage, a trough integrally formed in the floor and extending from one side of the cage to the other interiorly of the cage, the floor of the cage sloping rearwardly to said trough, said trough communicating with an opening in each side wall and being pitched to one of said sides so that a plurality of such cages can be positioned in side-to-side arrangement to form a bank of cages with the troughs aligned and connected to form a common drainage trough.

References Cited by the Examiner
UNITED STATES PATENTS

| | | | |
|---|---|---|---|
| 874,674 | 12/07 | Gruenwald et al. | 119—28 |
| 1,890,980 | 12/32 | Ferris | 119—28 |
| 2,552,641 | 5/51 | Morrison | 220—9 |
| 2,857,880 | 10/58 | Stone | 119—19 |
| 2,881,733 | 4/59 | Young et al. | 119—18 |
| 2,900,956 | 8/59 | Hoffman | 119—15 |

SAMUEL KOREN, *Primary Examiner.*

ALDRICH F. MEDBERY, *Examiner.*